Figure 1:
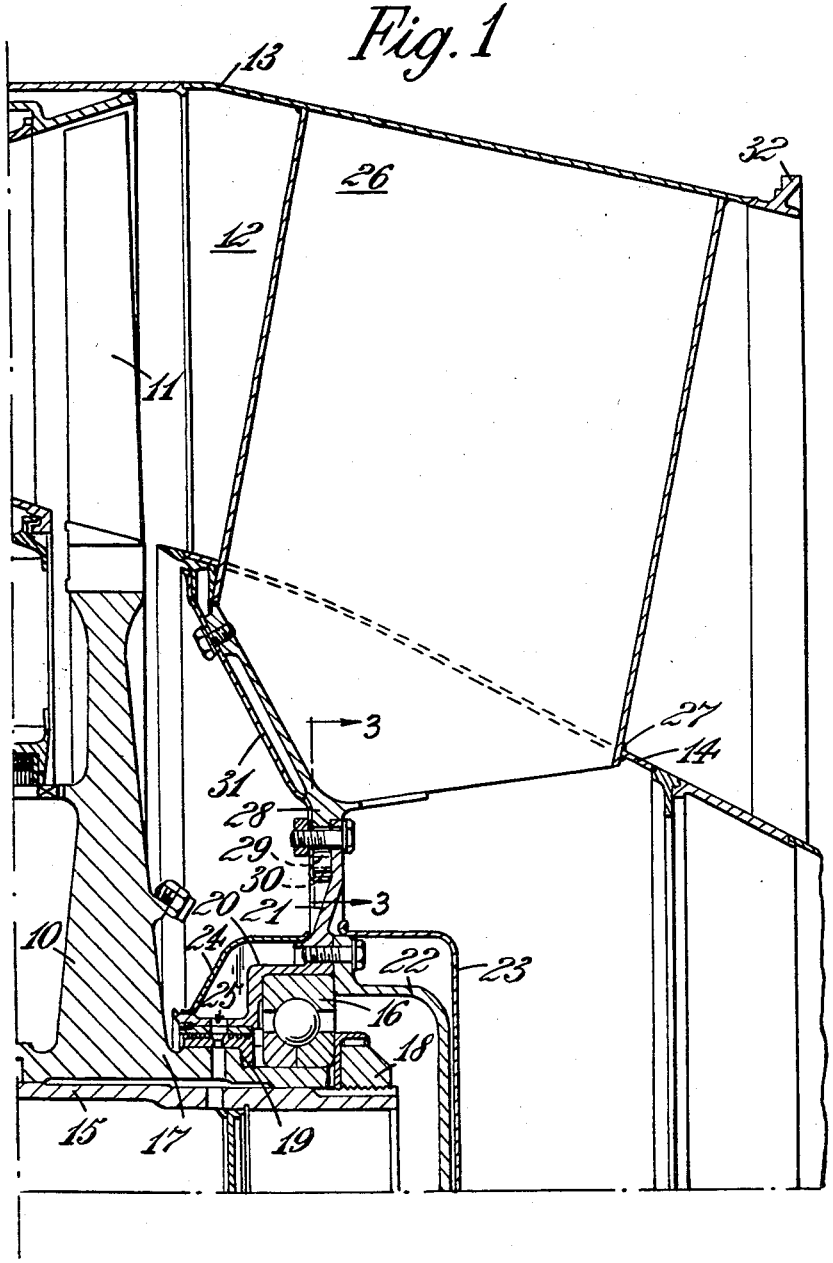

March 29, 1960 A. G. HENSTRIDGE 2,930,662
SUPPORTING STRUCTURE FOR A GAS TURBINE BEARING
Filed Oct. 14, 1957 2 Sheets-Sheet 2

United States Patent Office 2,930,662
Patented Mar. 29, 1960

2,930,662

SUPPORTING STRUCTURE FOR A GAS TURBINE BEARING

Alec George Henstridge, Bristol, England, assignor to Bristol Aero-Engines Limited, Bristol, England, a British company Application October 14, 1957, Serial No. 689,922

Claims priority, application Great Britain November 1, 1956

3 Claims. (Cl. 308—189)

This invention relates to a supporting structure for a gas turbine bearing.

In a known type of supporting structure for the rear bearing of the turbine of a gas turbine engine, an annular plate or diaphragm supports the turbine bearing from the inner wall or exhaust cone of the turbine diffuser and transmits the radial loads therebetween. As a result not only the supporting plate but also the diffuser inner wall require to be of heavy gauge construction and difficulties arise due to the thermal expansion of these heavy gauge components particularly at the connection between them which lies close to the gas swept surface of the diffuser inner wall. These difficulties are aggravated where radial vanes extend across the gas flow path of the diffuser to the diffuser inner wall and are welded to the latter adjacent the connection between the supporting plate and the diffuser inner wall, because the welded joints are subjected to considerable stress caused by the thermal expansion of the heavy gauge diffuser inner wall.

An object of the present invention is to provide an improved supporting structure for a gas turbine bearing. Another object is the provision of an improved supporting structure for the rear bearing of the turbine of a gas turbine engine the improvement being directed to avoiding or reducing the difficulties mentioned above.

According to the invention, a gas turbine bearing support structure comprises a number of load-bearing circumferentially spaced radially disposed members connected at their radial outer ends to the outer wall of an annular gas flow passage of the gas turbine, said members extending radially inward across the gas flow passage and through apertures in the inner wall of the gas flow passage, the radial inner ends of said members supporting the turbine bearing at points spaced inwardly from the inner wall of the gas flow passage and the members transmitting the radial loads on the bearing to the outer wall of said gas flow passage. Preferably said members are connected to the turbine bearing through an intermediate load-bearing member.

According to a feature of the invention the radially disposed members may be connected to said intermediate load bearing member in a manner allowing freedom for thermal expansion of the support structure in radial directions. In the application of the invention to a turbine rear bearing, the radially disposed members extend across the turbine diffuser, and in this case the members preferably take the form of faired exhaust vanes, the vanes being connected to the intermediate load-bearing member approximately midway between the bearing and the diffuser inner wall.

Figure 2:
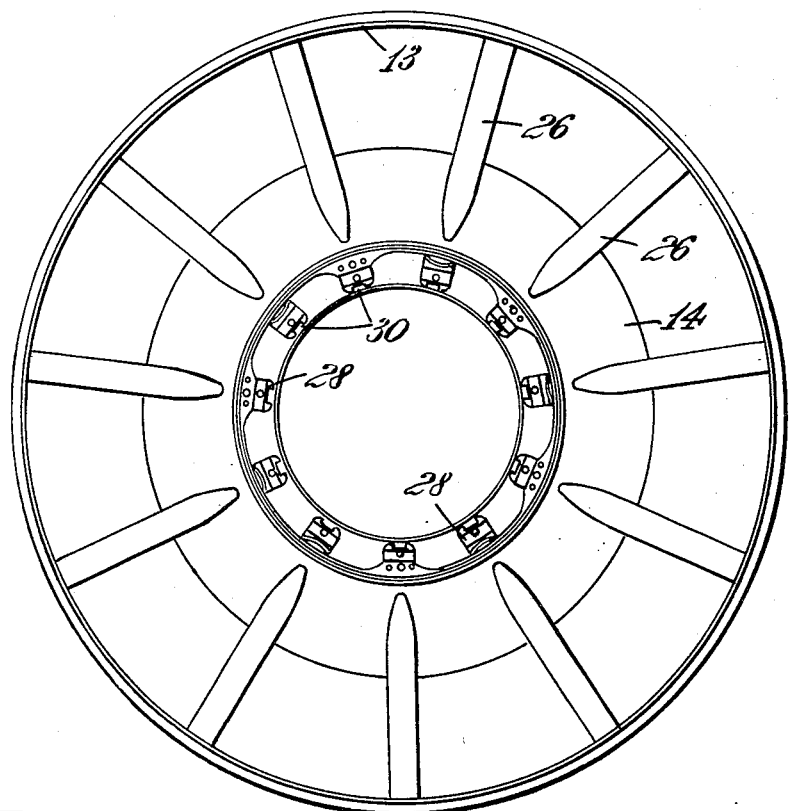
Figure 3:
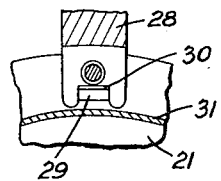

By way of example, the invention is hereinafter described with reference to the accompanying drawings in which:

Figure 1 shows in axial section the application of the invention to the turbine rear bearing of an axial flow gas turbine engine, Figure 2 shows an end view looking upstream and corresponding to Figure 1, but with certain parts omitted, and Figure 3 is a partial cross-sectional view on line 3—3 in Figure 2 and shows a detail of construction.

Referring to Figure 1, the last stage of an axial flow multistage turbine is represented by a turbine rotor disc 10 with blading 11 which exhausts into the annular flow passage of a turbine diffuser 12 defined between an outer wall 13 and an inner wall or exhaust cone 14. The multistage turbine rotor is mounted on a hollow shaft 15 supported in two bearings, only the rear one 16 of which is shown. The hub of the turbine disc is extended axially and rearwardly to form a sleeve 17 which is splined to the shaft 15 and carries on its outer face a labyrinth seal and the rear bearing 16. An abutment nut 18 is screwed on to the end of the shaft 15 and serves to locate the bearing 16 against a shoulder 19 on the sleeve. A cup-like housing 20 for the bearing races is provided with an annular flange 21 to which is bolted a cap member 22. Two light sealing plates 23, 24 are sprung on to the bearing assembly to define the outer wall of a passage for a cooling medium, such as air bled from a compressor, which may be fed from a series of radial ducts 25 extending through the labyrinth seal and communicating with the interior of the shaft 15. Air from the ducts 25 passes through aligned holes (not shown) in the flange 21 and the cap member 22 and then radially inwardly between the cap member and the sealing plate 23. In the present example the cooling air is used for cooling oil drain pipes, and is eventually discharged into the turbine exhaust.

The turbine diffuser 12 is provided (see also Figure 2) with a number of circumferentially spaced radially disposed load-bearing members in the form of exhaust vanes or struts 26 of faired shape which are connected at their outer radial ends to the outer wall 13 of the diffuser and extend radially inwards across the diffuser and through apertures 27 in the inner wall 14 of the diffuser, the apertures 27 corresponding in shape to the cross-sectional shape of the exhaust vanes 26. The vanes are welded to the inner wall 14, and after passing through the apertures 27, the leading and trailing edges of each vane converge towards one another as the vane continues to extend towards the turbine bearing until they come together at a position approximately midway between the turbine bearing 16 and the diffuser inner wall 14, and terminate in a lug 28, the lugs 28 being arranged in a ring, and lying against the forwardly facing surface of the flange 21. The flange 21 is provided with a circumferentially spaced series of tongues or pegs 29 or like projections (see also Figure 3) which engage in a like series of slots 30 formed one in each of the lugs 28, these tongue and slot connections being adapted to transmit radial loads between the flange 21 and the vanes 26 whilst permitting at the same time freedom for thermal expansion of the support structure in radial directions. Thus each tongue-and-slot connection is slidable radially to permit radial expansion of the flange 21 and the vane with which the tongue-and-slot connection is associated but because there is a ring of tongues and slots, and because the tongues-and-slots can move relatively to one another only in radial directions, the connections positively locate the flange 21 and transmit the radial loads on the bearing 16 to the vanes 26. From this it will be understood that at least three vanes 26 are required. The flange 21 is also secured to each of the vane lugs 28 by means of a bolt which as shown passes through the flange and the lug with clearance. With this arrangement the bolts take the end loads, and the flange 21 functions as an intermediate supporting member or diaphragm between the vanes and the turbine bearing. A light sealing plate 31 which is bolted to the converging portions of the vanes 26 prevents the escape of gas through the bolt holes in the lugs 28 and annular flange 21.

In Figure 2, which represents an end view looking upstream, the normal tail cone or downstream portion of the diffuser inner wall, and the annular flange 21, have been omitted to show the slots 30 in the lugs 28. The details of construction radially inwardly of the lugs 28 have also been omitted.

From the foregoing it will be seen that the supporting structure for the turbine bearing 16 comprises the strut-like exhaust vanes 26 and the intermediate member or flange 21, and that the turbine bearing is supported from the outer wall 13 of the diffuser 12 by this support structure without the radial loads from the bearing being transmitted to the inner wall or exhaust cone 14. The vanes 26 and the flange 21 are of heavy gauge construction, but the inner wall 14 need only be of light gauge construction and so the weld joints between the vanes and the inner wall which do not have to transmit radial loads from the bearing may be quite light since they are subjected to less thermal and other stresses.

By extending the inner ends of the vanes inwardly and well clear of the inner wall 14, the connection between the vanes 26 and the flange 21 is able to be made at a sufficient distance from the inner wall as will ensure that the connection is subject to appreciably lower temperature and stresses, and in addition the radial extent of the flange 21 is kept small, this avoiding the use of a large diameter heavy supporting plate or diaphragm.

I claim:

1. A gas turbine comprising a turbine rotor, a bearing for said rotor, inner and outer wall structures which together define an annular gas flow passage for the turbine, and at least three load-bearing circumferentially spaced radially disposed members for supporting said bearing and said inner wall structure from said outer wall structure, said members being connected, at their radial outer ends, to said outer wall structure, and, intermediate of their ends, to said inner wall structure, the radially inner ends of said members supporting said bearing at points spaced inwardly from said inner wall structure, said members transmitting the radial loads on the bearing to said outer wall structure.

2. A gas turbine comprising a turbine rotor, a bearing for said rotor, inner and outer wall structures which together define an annular gas flow passage for the turbine, at least three load-bearing circumferentially spaced radially disposed members for supporting said bearing and said inner wall structure from said outer wall structure, said members being connected, at their radial outer ends, to said outer wall structure, and, intermediate of their ends, to said inner wall structure, an intermediate load-bearing structure connected to said turbine bearing, and, for each of said members, means connecting the radial inner end of the member to said intermediate load-bearing structure at points spaced inwardly from the inner wall structure, said connecting means comprising a tongue-and-slot connection permitting radial expansion of the intermediate load-bearing structure and the member, said tongue-and-slot connections transmitting radial loads on said bearing through said members to said outer wall structure, and means for preventing relative axial movement between the intermediate load-bearing structure and the member, said preventing means transmitting axial loads on said bearing through said members to said outer wall structure.

3. A gas turbine comprising a turbine rotor, a rear bearing for said rotor, inner and outer wall structures which together define a diffuser for the turbine, at least three load-bearing circumferentially spaced radially disposed faired exhaust vanes for supporting said bearing and said inner wall structure from said outer wall structure, said vanes being connected, at their radial outer ends, to said outer wall structure, and, intermediate of their ends, to said inner wall structure, an intermediate load-bearing structure connected to said turbine bearing, and, for each of said vanes, means connecting the radial inner end of the vane to said intermediate load-bearing structure at approximately midway between the bearing and said inner wall structure, said connecting means comprising a tongue-and-slot connection permitting radial expansion of the intermediate load-bearing structure and the vane, said tongue-and-slot connections transmitting radial loads on said bearing through said vanes to said outer wall structure, and means for preventing relative axial movement between the intermediate load-bearing structure and the vane, said preventing means transmitting axial loads on said bearing through said vanes to said outer wall structure.

References Cited in the file of this patent

UNITED STATES PATENTS

| 2,616,662 | Mierley | Nov. 4, 1952 |
| 2,639,579 | Willgoos | May 26, 1953 |
| 2,680,001 | Batt | June 1, 1954 |
| 2,724,621 | Kenney | Nov. 22, 1955 |
| 2,741,455 | Hunter | Apr. 10, 1956 |
| 2,759,700 | Wheatley | Aug. 21, 1956 |

FOREIGN PATENTS

| 712,783 | Great Britain | July 28, 1954 |
| 205,791 | Australia | Jan. 29, 1957 |